April 21, 1925.
A. McD. McAFEE
1,534,130
PROCESS OF RECOVERING ALUMINUM CHLORIDE
Filed Jan. 26, 1922
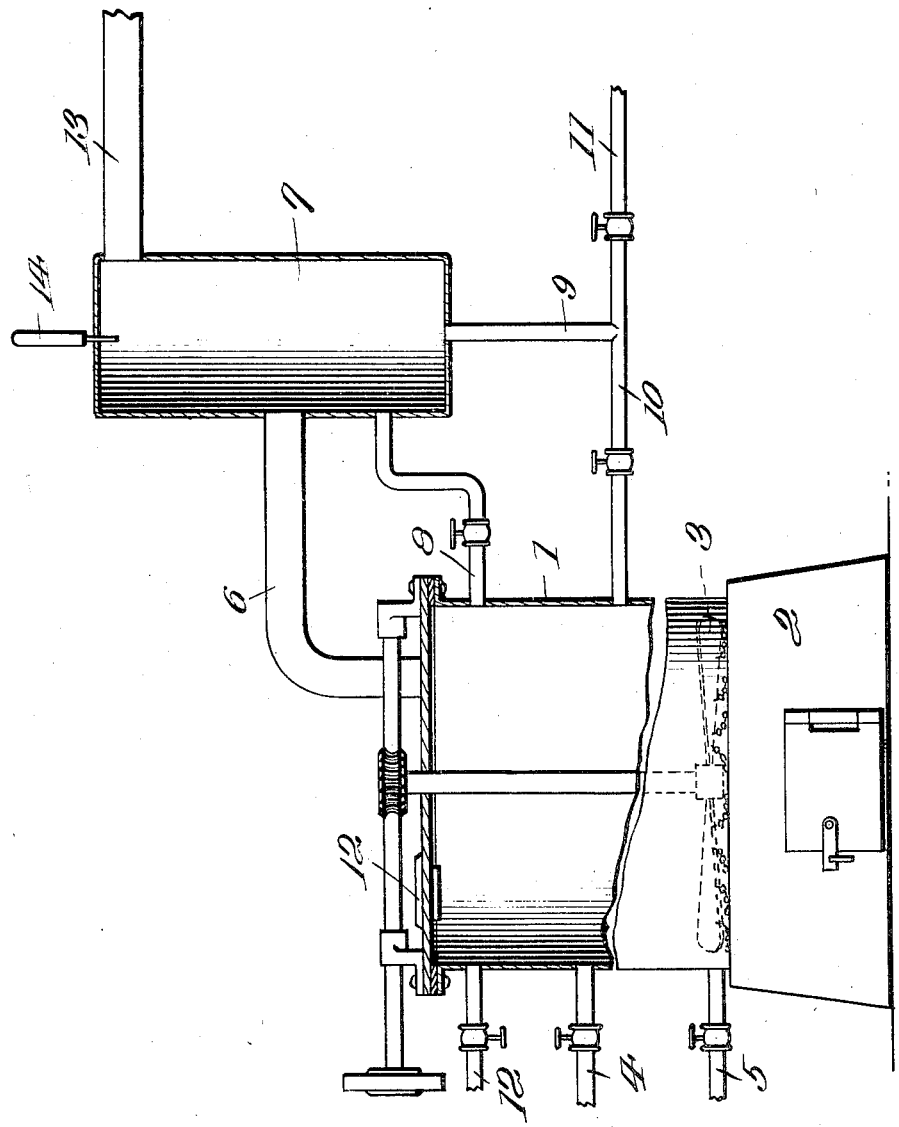

Patented Apr. 21, 1925.

1,534,130

UNITED STATES PATENT OFFICE.

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS.

PROCESS OF RECOVERING ALUMINUM CHLORIDE.

Application filed January 26, 1922. Serial No. 531,949.

*To all whom it may concern:*

Be it known that I, ALMER McDUFFIE McAFEE, a citizen of the United States, residing at Port Arthur, in the county of Jefferson and State of Texas, have invented certain new and useful Improvements in Processes of Recovering Aluminum Chloride, of which the following is a specification.

This invention relates to processes of recovering aluminum chloride and it comprises a method of recovering active aluminum chloride from spent residues containing the same by distilling out the chloride wherein such a residue is heated in a boiling body of oil, the vapors evolved are partially cooled to condense aluminum chloride therefrom and the aluminum chloride is separated from oil condensed at the same time, such oil being returned to said body; all as more fully hereinafter set forth and as claimed.

In a modern method of converting petroleum oils into oils of lowered boiling point, a high boiling oil is distilled in the presence of a small amount of aluminum chloride; usually about 5 to 10 per cent. The aluminum chloride added to the hot oil melts down to combine with a portion of it, forming a heavy liquid tending to underlie the rest of the oil but in practice it is kept in suspension therein by vigorous agitation. Presuming gas oil with a boiling point of, say, 600° F. to be the oil undergoing conversion, the mixture undergoes energetic ebullition at a temperature around 500° to 550° F.; the particular temperature depending somewhat on the amount of chloride and the age of the charge. The evolved vapors contain gasoline, kerosene, more or less unchanged gas oil and considerable proportions of volatilized aluminum chloride; or of its compounds with hydrocarbons. In practice, the vapors are partially cooled in a sort of backtrapping arrangement; usually in making gasoline to a temperature of 300–350° F. Condensed oils and chloride are returned to the bath. Residual vapors are sent to a suitable condenser. The described cooling is necessary since otherwise the boiling bath would be stripped of chloride and the condensers plugged. As the operation goes on, the heavy liquid mentioned becomes more and more viscous, and finally an asphaltic sludge. At this time its activity is exhausted, or nearly so, and it is customarily sent to recovery plants where it is heated to carbonize the asphalt and set free oils and volatilize the aluminum chloride.

In the present invention I have devised another method of recovering aluminum chloride in active form, taking advantage of the stated volatility of aluminum chloride with oil vapors, wherein I simply distill it out of the sludge. In this method the spent sludge is boiled with a body of oil and the vapors condensed as before; but instead of returning the condensed chloride, it is separated from the co-condensed oil and collected. The co-condensed oil is returned to the bath to aid in further stripping the sludge.

In a simple method of operation using gas oil, a body of gas oil is distilled with aluminum chloride in the usual way, backtrapping condensates as usual and replenishing the volume of the bath with new oil to compensate for the formation and removal of gasoline. This is continued until the activity of the chloride is spent, or as nearly so as may be deemed desirable. At this time, the supply of new oil is discontinued and the backtrapping arrangements so changed as to abstract the condensed aluminum chloride while still returning condensed oil. If the condensate here is given a chance to separate, the aluminum chloride goes to the bottom as a heavy oily liquid; it settles out of the co-condensed oil and the two are readily separated. In so operating, the sludge is progressively stripped of aluminum chloride. As the oil condensed in the backtrap, using gas oil in the still, is mostly kerosene in the end the still contains a mixture of unchanged gas oil, kerosene and asphaltic bodies (or coky carbon) formerly combined with aluminum chloride.

This oil may be removed from the still and redistilled to recover the kerosene and gas oil, leaving a residue of coke or asphalt, as the case may be.

The aluminum chloride is recovered from the condensing arrangement in the form of the heavy oily liquid formed when the chloride mixes with oil. The recovered aluminum chloride has its original activity as a catalyst.

In the accompanying illustration I have shown, more or less diagrammatically, certain apparatus within the present invention and capable of use in the performance of the described process. The showing is in central vertical section with certain parts in elevation. In this drawing, Element 1 is a still body set on furnace chamber 2 and provided with stirring means 3. Oil may be supplied by a valved inlet 4 and oil and sludge removed by valved conduit 5. At the top the still is provided with vapor outlet 6, shown as communicating with a simple air cooled condensing chamber 7. At a point above the bottom, this chamber is provided with valved outlet 8 leading back to the still and at its base it is provided with chloride outlet 9. As shown, this outlet has a valved branch 10 leading back to the still and another valved outlet 11, for removing liquid chloride. The still is also shown provided with inlets 12 for adding aluminum chloride, etc. Vapors not condensed in the air cooled condensing means pass forward through conduit 13 to a suitable condenser (not shown). Temperatures in the air cooled condenser are indicated by thermometer 14.

In the use of the described apparatus, presuming that aluminum chloride is to be used in forming gasoline and is then to be recovered in the same still, still 1 is supplied with a suitable mixture of aluminum chloride and oil and distillation resorted to. Fresh oil may be added from time to time through inlet 4. The vapors leave the still through 6 and are partially cooled in 7, the operation being so conducted that the temperature indicated by thermometer 14 is 300° to 350° F. During this time, the valve of 8 and the valve of 10 are opened and the valve of 11 closed, so that the condensed oil and the condensed chloride in 7 reflux back to the still. After a time, when the activity of the chloride is spent, or nearly so, the feed of fresh oil through 4 is shut off or lessened and the valve of 10 closed, while the valve of 11 is opened. Agitation is continuous. Under these circumstances, the aluminum chloride is steadily boiled out of the body of oil and condensed in 7 and withdrawn at 11. Oil condensed in 7 is returned to the still through 8. Any gasoline that may be formed during this recovery passes forward through 13 for condensation in the usual manner. After a time when aluminum chloride ceases to appear at 11, the operation is discontinued. At this time, still 1, will contain unchanged gas oil and more or less kerosene, together with coke or asphaltic residues. The mixture in the still is removed at 5 and is treated in any suitable manner.

The operation is exactly the same if the sludge has been produced elsewhere. In this event, it is charged in still 1 through inlet 12, a proper amount of oil, which may be gas oil, supplied and the operation carried on in the manner just set forth.

The oils condensing in 7, using gas oil in 1, are of the character of kerosene, and the recovery of aluminum chloride may be combined with the manufacture of kerosene. In this event, a less feed of gas oil through 4 is continued throughout the recovery operation and the valve in 8 as well as the valve in 10 are kept closed. Under these conditions, the kerosene condensed in 7, like the aluminum chloride, flows out through outlet conduit 11. The two may be gravitally separated and the oil refined in the usual ways. The kerosene being of saturated nature, it needs but little treatment, except to remove the adhering aluminum chloride, which may be done with sulfuric acid.

What I claim is:—

1. The process of recovering aluminum chloride from spent residues containing the same which comprises boiling the said residues in a body of oil, cooling the evolved vapors to condense therefrom aluminum chloride high boiling oil, separating the aluminum chloride from the condensed oils and removing the separated aluminum chloride from the system.

2. The process of recovering aluminum chloride from spent residues containing the same which comprises boiling the said residues in a body of oil, cooling the evolved vapors to condense aluminum chloride and high boiling oil therefrom, separating the aluminum chloride from the condensed oil, removing the separated aluminum chloride from the system and returning the condensed oil to the boiling body.

3. Process in accordance with claim 1 in which the spent residue operated upon are those resulting from distillation of high boiling hydrocarbons with aluminum chloride and in which the oil used for boiling the spent residues is residual oil left after lower boiling hydrocarbons have been removed.

4. The process of recovering aluminum chloride from spent residues containing the same which comprises boiling said residues in a body of oil, cooling the evolved vapors to condense therefrom aluminum chloride and high boiling oil, separating the aluminum chloride from the condensed oils, returning the condensed oils to the boiling body to furnish the oil to assist in stripping the residues of aluminum chloride, removing from the system the separated aluminum chloride which is stripped from the residues by said returned oil, and so conducting the distillation and return of condensed oils that when all aluminum chloride has been stripped from said residues there remains a body of the high boiling oil which has been constantly circulated.

In testimony whereof, I have hereunto affixed my signature.

ALMER McDUFFIE McAFEE.